US009811994B1

(12) United States Patent
Salzer

(10) Patent No.: US 9,811,994 B1
(45) Date of Patent: Nov. 7, 2017

(54) CARBON MONOXIDE DETECTION ASSEMBLY

(71) Applicant: Thomas Salzer, Sauk Raoids, MN (US)

(72) Inventor: Thomas Salzer, Sauk Raoids, MN (US)

( * ) Notice: Subject to any disclaimer, the term of this patent is extended or adjusted under 35 U.S.C. 154(b) by 0 days.

(21) Appl. No.: 15/285,905

(22) Filed: Oct. 5, 2016

(51) Int. Cl.

| | |
|---|---|
| ***G08B 17/10*** | (2006.01) |
| ***G08B 21/14*** | (2006.01) |
| ***E05F 15/72*** | (2015.01) |
| ***G05D 7/06*** | (2006.01) |
| ***G08B 3/10*** | (2006.01) |
| ***G08B 5/36*** | (2006.01) |

(52) U.S. Cl.
CPC .............. *G08B 21/14* (2013.01); *E05F 15/72* (2015.01); *G05D 7/0635* (2013.01); *G08B 3/10* (2013.01); *G08B 5/36* (2013.01); *E05Y 2400/44* (2013.01); *E05Y 2400/52* (2013.01); *E05Y 2900/106* (2013.01)

(58) Field of Classification Search
CPC . G08B 21/14; G08B 3/10; G08B 5/36; G05D 7/0635; E05F 15/72; E05Y 2900/106; E05Y 2400/44; E05Y 2400/52
USPC .................. 340/632, 506, 531, 540, 539.22; 701/110; 702/24
See application file for complete search history.

(56) References Cited

U.S. PATENT DOCUMENTS

| | | | | |
|---|---|---|---|---|
| 6,045,351 | A | 4/2000 | Dobbeling et al. | |
| D431,487 | S | 10/2000 | Rienks | |
| 6,339,379 | B1 | 1/2002 | Argus et al. | |
| 6,374,850 | B1 * | 4/2002 | Timm | A62C 2/04 137/39 |
| 6,552,647 | B1 * | 4/2003 | Thiessen | G05B 15/02 122/448.1 |
| 7,183,933 | B2 * | 2/2007 | Dzurko | G08B 21/14 318/280 |
| 7,710,284 | B2 | 5/2010 | Dzurko et al. | |
| 8,669,878 | B1 * | 3/2014 | Vantilburg | A62B 5/00 318/282 |
| 2006/0202815 | A1 * | 9/2006 | John | G08B 21/14 340/531 |
| 2008/0180261 | A1 | 7/2008 | Shirlee | |

* cited by examiner

*Primary Examiner* — Dhaval Patel

(57) ABSTRACT

A carbon monoxide detection assembly includes a detection unit that may be positioned in an enclosed area. The detection unit includes a carbon monoxide sensor to detect carbon monoxide in the enclosed area. A remote unit is in electrical communication with a garage door opener and the detection unit. The remote unit turns the garage door opener on when the carbon monoxide sensor detects carbon monoxide. A valve is fluidly coupled to a fuel source for a gas appliance and the valve is in electrical communication with the detection unit. The valve restricts the fuel from flowing to the gas appliance when the detection unit detects carbon monoxide. A communication unit is in electrical communication with an emergency responder and the detection unit. The communication unit alerts the emergency responder that carbon monoxide has been detected in the enclosed area.

11 Claims, 4 Drawing Sheets

CARBON MONOXIDE DETECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to detection devices and more particularly pertains to a new detection device for detecting carbon monoxide in an enclosed area.

BRIEF SUMMARY OF THE INVENTION

An embodiment of the disclosure meets the needs presented above by generally comprising a detection unit that may be positioned in an enclosed area. The detection unit includes a carbon monoxide sensor to detect carbon monoxide in the enclosed area. A remote unit is in electrical communication with a garage door opener and the detection unit. The remote unit turns the garage door opener on when the carbon monoxide sensor detects carbon monoxide. A valve is fluidly coupled to a fuel source for a gas appliance and the valve is in electrical communication with the detection unit. The valve restricts the fuel from flowing to the gas appliance when the detection unit detects carbon monoxide. A communication unit is in electrical communication with an emergency responder and the detection unit. The communication unit alerts the emergency responder that carbon monoxide has been detected in the enclosed area.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
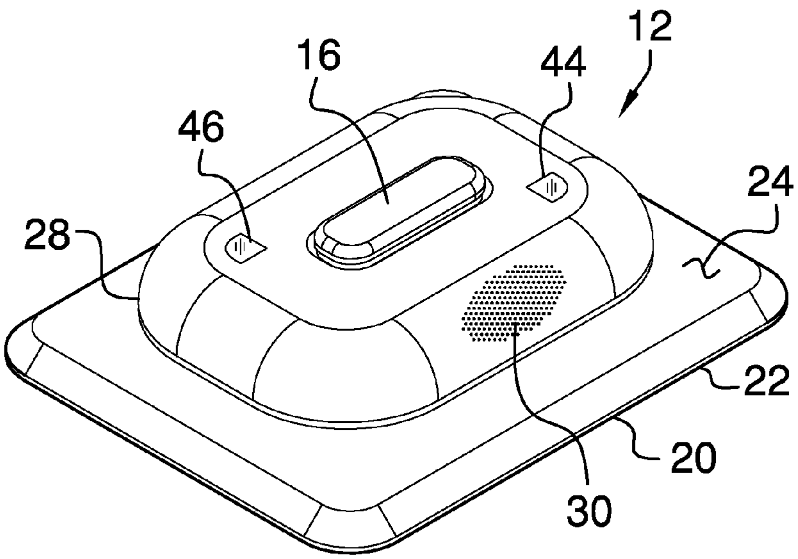
FIG. 1 is a top perspective view of a carbon monoxide detection assembly according to an embodiment of the disclosure.
Figure 2:
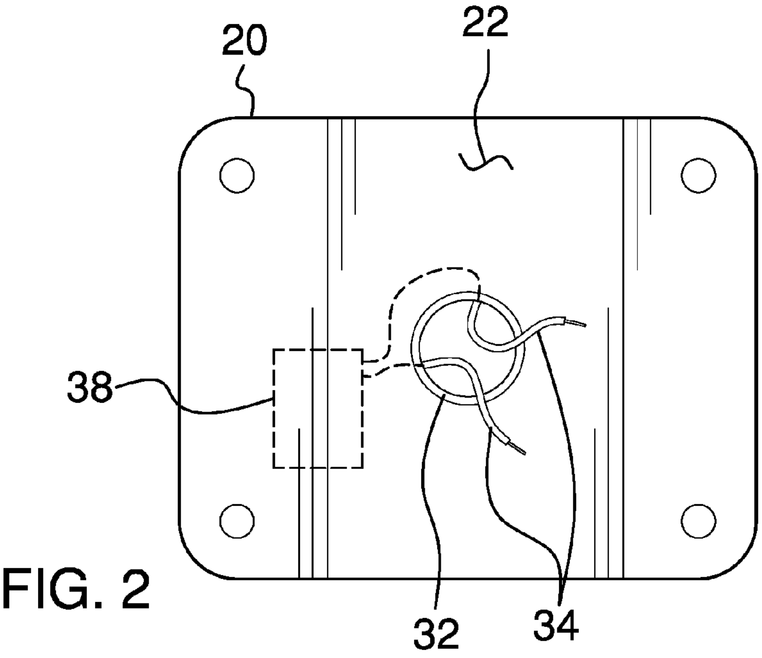
FIG. 2 is a bottom view of an embodiment of the disclosure.
Figure 3:
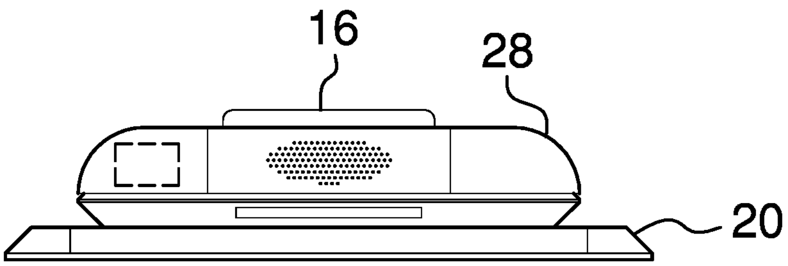
FIG. 3 is a right side view of an embodiment of the disclosure.
Figure 4:
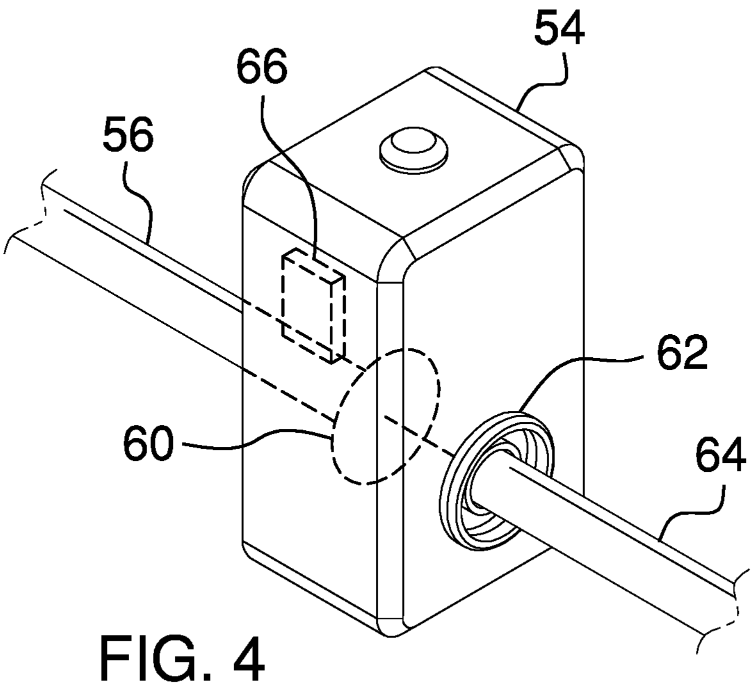
FIG. 4 is a perspective view of valve an embodiment of the disclosure.
Figure 5:
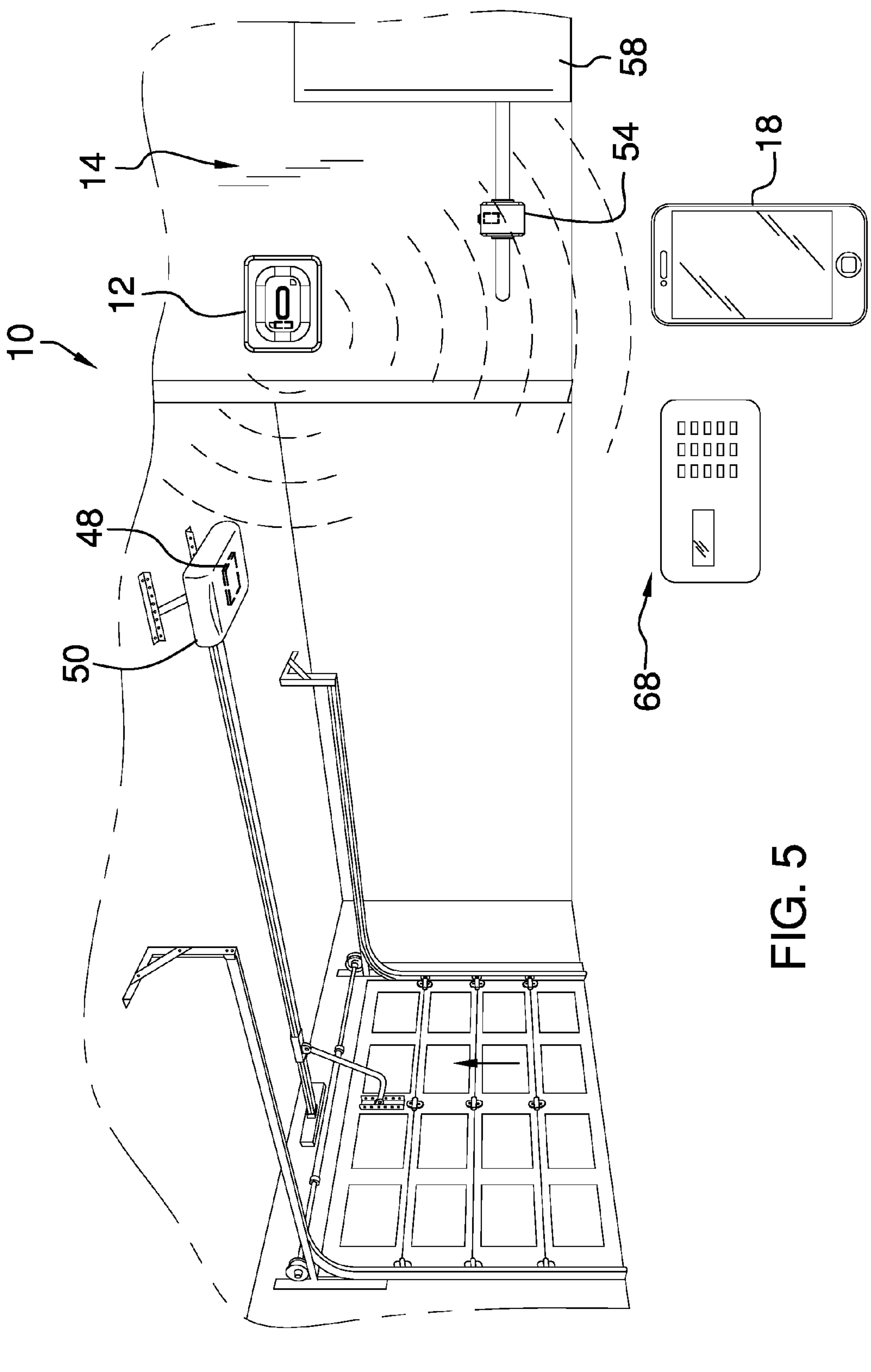
FIG. 5 is a perspective in-use view of an embodiment of the disclosure.
Figure 6:
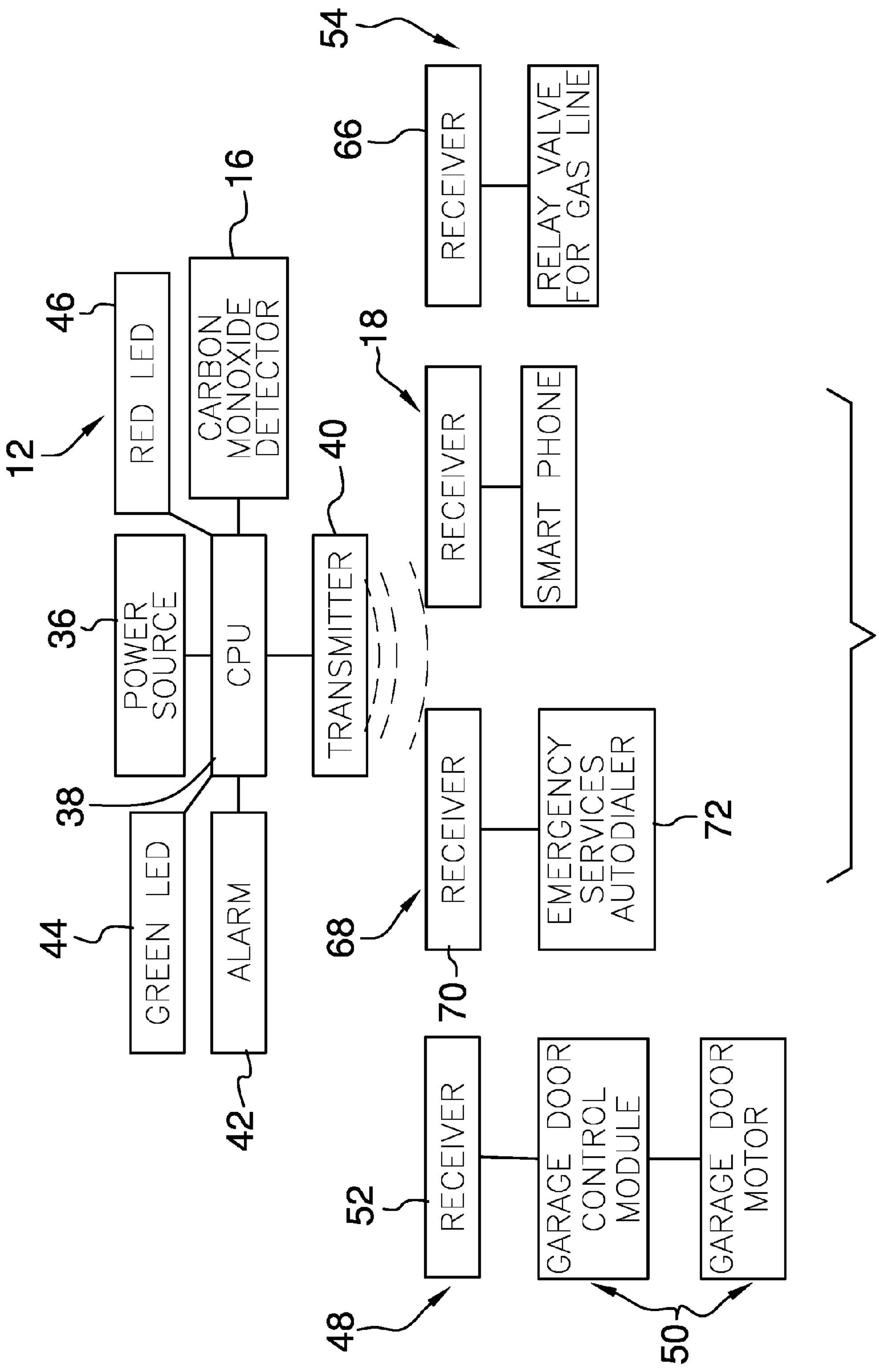
FIG. 6 is a schematic view of an embodiment of the disclosure.

With reference now to the drawings, and in particular to FIGS. 1 through 6 thereof, a new detection device embodying the principles and concepts of an embodiment of the disclosure and generally designated by the reference numeral 10 will be described.

As best illustrated in FIGS. 1 through 6, the carbon monoxide detection assembly 10 generally comprises a detection unit 12 that may be positioned in an enclosed area 14. The enclosed area 14 may a house, a boat, a business or other location intended for occupancy. The detection unit 12 includes a carbon monoxide sensor 16. Thus, the carbon monoxide sensor 16 detects carbon monoxide in the enclosed area 14. The detection unit 12 is configured to be in electrical communication with an extrinsic electronic device 18. The extrinsic electronic device 18 may be a smart phone or the like.

The detection unit 12 comprises a plate 20 that has a first surface 22 and a second surface 24. The first surface 22 may be secured to a support surface 26 in the enclosed area 14. The support surface 26 may be a ceiling or a wall. A housing 28 is coupled to the second surface 24. The housing 28 has a vent 30 extending therethrough to pass air into an interior of the housing 28. The plate 20 has an opening 32 extending through the first surface 22 and the second surface 24.

A pair of conductors 34 extends outwardly through the opening 32. Each of the conductors 34 is electrically coupled to a power source 36. The power source 36 may comprise an electrical system in the enclosed area 14. A processor 38 is positioned within the housing 28 and the processor 38 is electrically coupled to the pair of conductors 34.

The carbon monoxide sensor 16 is positioned within the housing 28. The carbon monoxide sensor 16 is electrically coupled to the processor 38. The processor 38 generates an alarm sequence when the carbon monoxide sensor 16 detects carbon monoxide. The carbon monoxide sensor 16 may comprise an electronic carbon monoxide sensor 16 or the like.

A transmitter 40 is provided and the transmitter 40 is positioned within the housing 28. The transmitter 40 is electrically coupled to the processor 38. The transmitter 40 is in electrical communication with the extrinsic electronic device 18 when the processor 38 generates the alarm sequence. Thus, a user is notified that carbon monoxide has been detected in the enclosed area 14. The transmitter 40 may comprise a radio frequency transmitter 40 or the like.

A speaker 42 is coupled to the housing 28 and the speaker 42 is electrically coupled to the processor 38. The speaker 42 emits an audible alarm when the processor 38 generates the alarm sequence. Thus, the speaker 42 alerts occupants in the enclosed area 14 that carbon monoxide has been detected in the enclosed area 14. The speaker 42 may comprise an electronic speaker 42 or the like.

A first light emitter 44 is coupled to the housing 28 and the first light emitter 44 selectively emits light outwardly from the housing 28. The first light emitter 44 is electrically coupled to the processor 38. The processor 38 turns the first light emitter 44 on when the processor 38 does not generate the alarm sequence. The first light emitter 44 may comprise an LED or the like and the first light emitter 44 may emit green light.

A second light emitter 46 is coupled to the housing 28 and the second light emitter 46 selectively emits light outwardly from the housing 28. The second light emitter 46 is electrically coupled to the processor 38. The processor 38 turns the second light emitter 46 on when the processor 38 generates the alarm sequence. The second light emitter 46 may comprise an LED or the like and the second light emitter 46 may emit red light.

A remote unit 48 is provided. The remote unit 48 is in electrical communication with a garage door opener 50. The garage door opener 50 may be a remote controlled garage door opener 50 or the like. The remote unit 48 is in electrical communication with the detection unit 12. The remote unit 48 turns the garage door opener 50 on when the carbon monoxide sensor 16 detects carbon monoxide.

The remote unit 48 comprises a first receiver 52. The first receiver 52 is electrically coupled to the garage door opener 50. The first receiver 52 is in electrical communication with the transmitter 40. Thus, the first receiver 52 turns the garage door opener 50 on when the processor 38 generates the alarm sequence. The garage door opener 50 opens a garage door when the garage door opener 50 is turned on. Thus, the occupants of the enclosed area 14 may exit the enclosed area 14. The first receiver 52 may comprise a radio frequency receiver or the like.

A valve 54 is provided and the valve 54 is fluidly coupled to a fuel source 56 for a gas appliance 58. Thus, the valve 54 selectively restricts and allows fuel to flow to the gas appliance 58. The gas appliance 58 may be a stove, a clothes dryer or other gas appliance 58. The valve 54 may comprise an electrically controlled gas valve or the like. The valve 54 is in electrical communication with the detection unit 12. The valve 54 restricts the fuel from flowing to the gas appliance 58 when the detection unit 12 detects carbon monoxide. The valve 54 is electrically coupled to the gas appliance 58.

The valve 54 includes an input 60 that is fluidly coupled to the fuel source 56. The fuel source 56 may comprise a gas line or the like. The input 60 is selectively turned on to allow the fuel to flow through the valve 54. The input 60 is selectively turned off to restrict the fuel from flowing through the valve 54. The fuel may be natural gas or other gaseous fuel.

The valve 54 further includes an output 62. The output 62 is coupled to a supply line 64 of the gas appliance 58. The output 62 is in fluid communication with the input 60. Thus, the output 62 selectively provides the fuel to the gas appliance 58.

A second receiver 66 is provided. The second receiver 66 is electrically coupled to the valve 54 and the second receiver 66 selectively turns the input 60 on and off. The second receiver 66 is in electrical communication with the transmitter 40. The input 60 is turned off when the processor 38 generates the alarm sequence. The second receiver 66 may comprise a radio frequency receiver or the like.

A communication unit 68 is provided. The communication unit 68 is in electrical communication with an emergency responder. The communication unit 68 is in electrical communication with the detection unit 12. Thus, the communication unit 68 alerts the emergency responder that carbon monoxide has been detected in the enclosed area 14. The emergency responder may be 911 or the like.

The communication unit 68 includes a transceiver 70 that is in electrical communication with an extrinsic communication network 72. The extrinsic communication network may be the internet, a telephone network or other communication network. The transceiver 70 communicates the emergency responder via the extrinsic communication network 72. The transceiver 70 is in electrical communication with the transmitter 40. The transceiver 70 contacts the emergency responder when the processor 38 generates the alarm sequence. The transceiver 70 may comprise a radio frequency transceiver 70 or the like.

In use, the detection unit 12 is placed in a selected location in the enclosed area 14. The remote unit 48 is electrically coupled to the garage door opener 50. The valve 54 is fluidly coupled to between the fuel source 56 and the gas appliance 58. The remote unit 48 opens the garage door and the valve 54 turns off the fuel supply when the carbon monoxide sensor 16 detects carbon monoxide. The communication unit 68 contacts the emergency responder when the carbon monoxide sensor 16 detects carbon monoxide. Thus, the emergency responders respond to a possible fire or the like in the enclosed area 14. Additionally, the detection unit 12 notifies the extrinsic electronic device 18 that the carbon monoxide sensor 16 has detected carbon monoxide.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A carbon monoxide detection assembly being configured to shut off gas appliances and open a garage door when said assembly detects carbon monoxide, said assembly comprising:

a detection unit being configured to be positioned in an enclosed area, said detection unit including a carbon monoxide sensor wherein said carbon monoxide sensor is configured to detect carbon monoxide in the enclosed area, said detection being configured to be in communication with an extrinsic electronic device, said detection unit including a housing, said housing having a vent extending therethrough wherein said vent is configured to pass air into an interior of said housing;

a processor being positioned within said housing, said processor generating an alarm sequence when said carbon monoxide sensor detects carbon monoxide, said processor being configured to be electrically coupled to a power source;

a remote unit being configured to be in electrical communication with a garage door opener, said remote unit being in communication with said detection unit, said remote unit turning the garage door opener on when said carbon monoxide sensor detects carbon monoxide;

a valve being configured to be fluidly coupled to a fuel source for a gas appliance thereby facilitating said valve to selectively restrict and allow fuel to flow to the gas appliance, said valve being in communication with said detection unit, said valve being configured to restrict the fuel from flowing to the gas appliance when said detection unit detects carbon monoxide, said valve being configured to be electrically coupled to the gas appliance;

a communication unit being configured to be in electrical communication with an emergency responder, said communication unit being in electrical communication with said detection unit wherein said communication unit is configured to alert the emergency responder that carbon monoxide has been detected in the enclosed area;

a first light emitter being coupled to said housing wherein said first light emitter is configured to emit light outwardly from said housing, said first light emitter being electrically coupled to said processor, said processor turning said first light emitter on when said processor does not generate said alarm sequence; and a second light emitter being coupled to said housing wherein said second light emitter is configured to emit light outwardly from said housing, said second light emitter being electrically coupled to said processor, said processor turning said second light emitter on when said processor generates said alarm sequence.

2. The assembly according to claim 1, wherein said detection unit comprises a plate having a first surface and a second surface, said first surface being configured to be secured to a support surface in the enclosed area.

3. The assembly according to claim 1, wherein said carbon monoxide sensor is positioned within said housing, said carbon monoxide sensor being electrically coupled to said processor.

4. The assembly according to claim 1, further comprising a transmitter being positioned within said housing, said transmitter being electrically coupled to said processor, said transmitter being configured to be in electrical communication with the extrinsic electronic device when said processor generates said alarm sequence.

5. The assembly according to claim 4, wherein said remote unit comprises a first receiver, said first receiver being configured to be electrically coupled to said garage door opener, said first receiver being in electrical communication with said transmitter wherein said first receiver is configured to turn the garage door opener on when said processor generates said alarm sequence.

6. The assembly according to claim 5, further comprising:

a processor selectively generating an alarm sequence;

a transmitter; and a second receiver being electrically coupled to said valve such that said second receiver selectively turns said input on and off, said second receiver being in electrical communication with said transmitter, said input being turned off when said processor generates said alarm sequence.

7. The assembly according to claim 4, wherein said communication unit comprises a transceiver being configured to be in electrical communication with the emergency responder, said transceiver being in electrical communication with said transmitter, said transceiver communicating with the emergency responder when said processor generates said alarm sequence.

8. The assembly according to claim 1 further comprising a speaker being coupled to said housing, said speaker being electrically coupled to said processor wherein said speaker is configured to emit an audible alarm when said processor generates said alarm sequence thereby facilitating said speaker to alert that carbon monoxide has been detected in the enclosed area.

9. The assembly according to claim 1, wherein said valve comprises an input being configured to be fluidly coupled to the fuel source, said input being selectively turned on wherein said input is configured to allow the fuel to flow through said valve, said input being selectively turned off wherein said input is configured to restrict the fuel from flowing through said valve.

10. The assembly according to claim 9, further comprising an output being configured to be fluidly coupled to a supply line of the gas appliance, said output being in fluid communication with said input.

11. A carbon monoxide detection assembly being configured to shut off gas appliances and open a garage door when said assembly detects carbon monoxide, said assembly comprising:

a detection unit being configured to be positioned in an enclosed area, said detection unit including a carbon monoxide sensor wherein said carbon monoxide sensor is configured to detect carbon monoxide in the enclosed area, said detection unit being configured to be in communication with an extrinsic electronic device, said detection unit comprising:

a plate having a first surface and a second surface, said first surface being configured to be secured to a support surface in the enclosed area, a housing being coupled to said second surface, said housing having a vent extending therethrough wherein said vent is configured to pass air into an interior of said housing, a processor being positioned within said housing, said processor generating an alarm sequence when said carbon monoxide sensor detects carbon monoxide, said processor being configured to be electrically coupled to a power source, said carbon monoxide sensor being positioned within said housing, said carbon monoxide sensor being electrically coupled to said processor, a transmitter being positioned within said housing, said transmitter being electrically coupled to said processor, said transmitter being configured to be in communication with the extrinsic electronic device when said processor generates said alarm sequence, a speaker being coupled to said housing, said speaker being electrically coupled to said processor wherein said speaker is configured to emit an audible alarm when said processor generates said alarm sequence thereby facilitating said speaker to alert that carbon monoxide has been detected in the enclosed area, a first light emitter being coupled to said housing wherein said first light emitter is configured to emit light outwardly from said housing, said first light emitter being electrically coupled to said processor, said processor turning said first light emitter on when said processor does not generate said alarm sequence, a second light emitter being coupled to said housing wherein said second light emitter is configured to emit light outwardly from said housing, said second light emitter being electrically coupled to said processor, said processor turning said second light emitter on when said processor generates said alarm sequence;

a remote unit being configured to be in electrical communication with a garage door opener, said remote unit being in communication with said detection unit, said remote unit turning the garage door opener on when said carbon monoxide sensor detects carbon monoxide, said remote unit comprising a first receiver, said first receiver being configured to be electrically coupled to said garage door opener, said first receiver being in electrical communication with said transmitter wherein said first receiver is configured to turn the garage door opener on when said processor generates said alarm sequence;

a valve being configured to be fluidly coupled to a fuel source for a gas appliance thereby facilitating said valve to selectively restrict and allow fuel to flow to the gas appliance, said valve being in communication with said detection unit, said valve being configured to restrict the fuel from flowing to the gas appliance when said detection unit detects carbon monoxide, said valve being configured to be electrically coupled to the gas appliance, said valve comprising:

an input being configured to be fluidly coupled to the fuel source, said input being selectively turned on wherein said input is configured to allow the fuel to flow through said valve, said input being selectively turned off wherein said input is configured to restrict the fuel from flowing through said valve, an output being configured to be fluidly coupled to a supply line of the gas appliance, said output being in fluid communication with said input, and a second receiver being electrically coupled to said valve such that said second receiver selectively turns said input on and off, said second receiver being in electrical communication with said transmitter, said input being turned off when said processor generates said alarm sequence;

a communication unit being configured to be in electrical communication with an emergency responder, said communication unit being in electrical communication with said detection unit wherein said communication unit is configured to alert the emergency responder that carbon monoxide has been detected in the enclosed area, said communication unit comprising a transceiver being configured to be in electrical communication with the emergency responder, said transceiver being in electrical communication with said transmitter, said transceiver communicating with the emergency responder when said processor generates said alarm sequence.

* * * * *